United States Patent
Genuit

[11] 3,855,518
[45] Dec. 17, 1974

[54] SWITCHING REGULATOR USING GATE-TURN-OFF SCR

[75] Inventor: Luther L. Genuit, Scottsdale, Ariz.

[73] Assignee: Honeywell Information Systems Inc., Waltham, Mass.

[22] Filed: Dec. 26, 1973

[21] Appl. No.: 427,779

[52] U.S. Cl.............. 321/2, 307/252 C, 321/45 C, 331/112
[51] Int. Cl. ........................................... H02m 3/32
[58] Field of Search............ 307/252 C, 240; 321/2, 321/43–45, 45 C; 331/112

[56] References Cited
UNITED STATES PATENTS

| | | | |
|---|---|---|---|
| 3,271,700 | 9/1966 | Gutzwiller.................. | 307/252 C X |
| 3,297,911 | 1/1967 | Quinn......................... | 307/252 C X |
| 3,308,800 | 8/1967 | Motto, Jr. et al............... | 307/252 C |
| 3,681,711 | 8/1972 | Hanby................................. | 331/112 |
| 3,728,558 | 4/1973 | Genuit et al........................ | 331/112 |

Primary Examiner—R. N. Envall, Jr.
Attorney, Agent, or Firm—Edward W. Hughes

[57] ABSTRACT

A single gate-turn-off silicon controlled rectifier is used with a transformer, capacitors, resistors and diodes to provide a low-cost compact switching regulator which converts a relatively large value of unregulated DC voltage to a relatively small value of regulated DC voltage.

8 Claims, 2 Drawing Figures

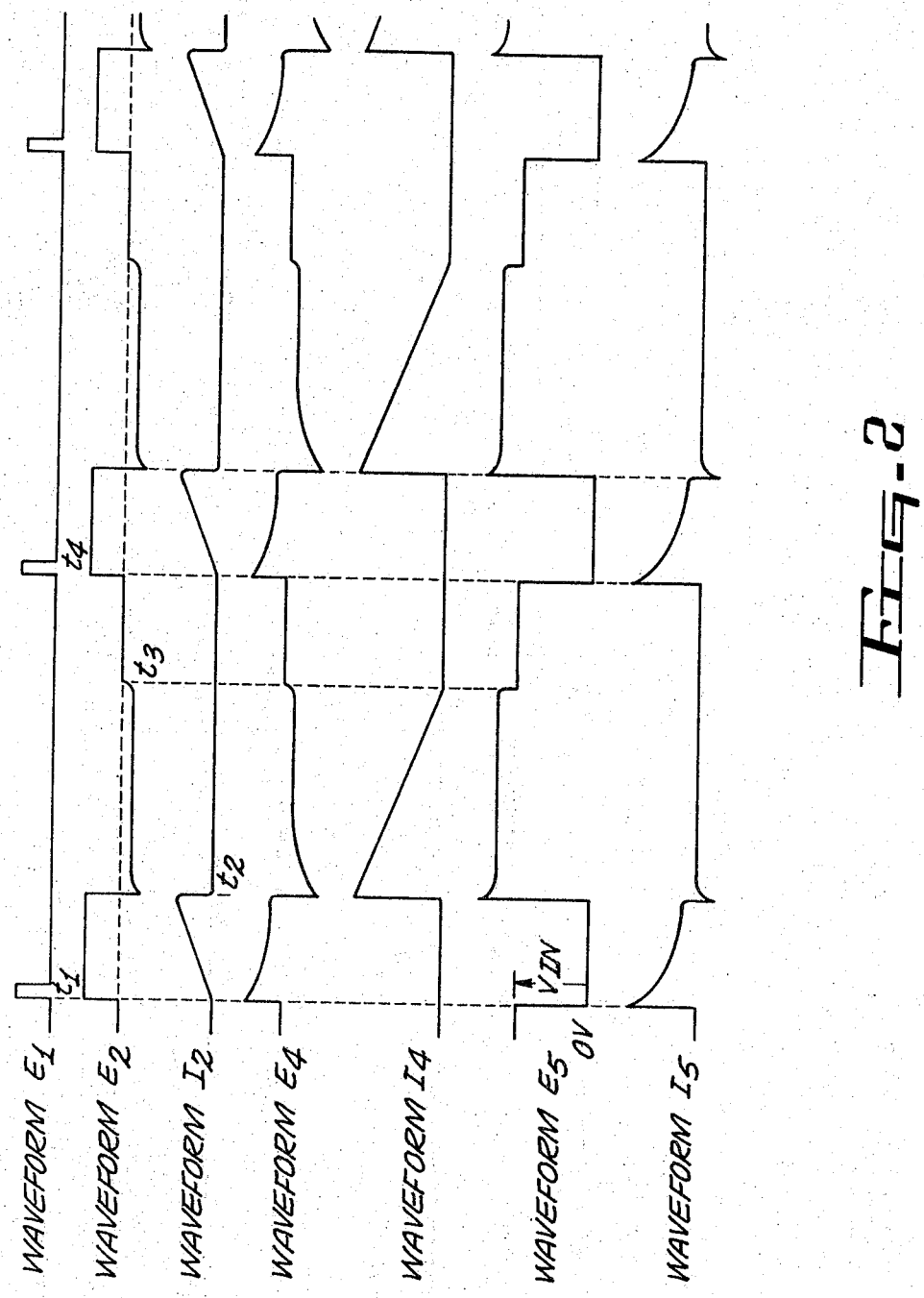

SWITCHING REGULATOR USING GATE-TURN-OFF SCR

BACKGROUND OF THE INVENTION

This invention relates to power supplies and more particularly to power supplies using a low-cost compact switching regulator to supply a relatively small value of regulated DC voltage.

In high speed data processing systems switching regulators may be used to provide DC power to electronic circuits in the system. These regulators are smaller and more efficient than prior art power supplies so that the regulators may be located in cabinets which contain the circuits rather than in a separate cabinet as required when prior art power supplies are used. Location of switching regulators near the circuits greatly reduces the length of cables which distribute the currents to the circuits and reduces the amount of error signals which may be caused by variation in voltage in long cables.

Prior art switching regulators may employ a pair of transformers, a pair of silicon controlled rectifiers and a source of signals to convert a relatively large value of unregulated DC voltage to a relatively small value of regulated DC voltage. The transformers and the silicon controlled rectifiers used in the prior art circuits are relatively expensive thereby causing the prior art switching regulators to be relatively expensive. What is needed is a switching regulator using fewer parts so that the regulator is less expensive to construct.

The present invention provides a switching regulator using a single transformer and a single gate-turn-off silicon controlled rectifier to decrease the expense of constructing the regulator.

It is, therefore, an object of this invention to provide a new and improved switching regulator using a gate-turn-off silicon controlled rectifier.

Another object of this invention is to provide an inexpensive switching regulator.

Still another object of this invention is to provide a switching regulator using fewer components than the prior art regulators.

A further object of this invention is to provide a switching regulator which is more compact than the prior art regulators.

SUMMARY OF THE INVENTION

The foregoing objects are achieved in the present invention by providing a new and improved switching regulator which uses a single transformer, a single gate-turn-off silicon controlled rectifier, capacitors, resistors and diodes to provide a low-cost compact switching regulator which converts a relatively large value of unregulated DC voltage to a relatively small value of regulated DC voltage.

Other objects and advantages of this invention will become apparent from the following description when taken in connection with the accompanying drawings.

BRIEF DESCRIPTION OF THE DRAWINGS

FIG. 2 illustrates waveforms which are used when explaining the present invention.

DESCRIPTION OF THE PREFERRED EMBODIMENT

Figure 1:
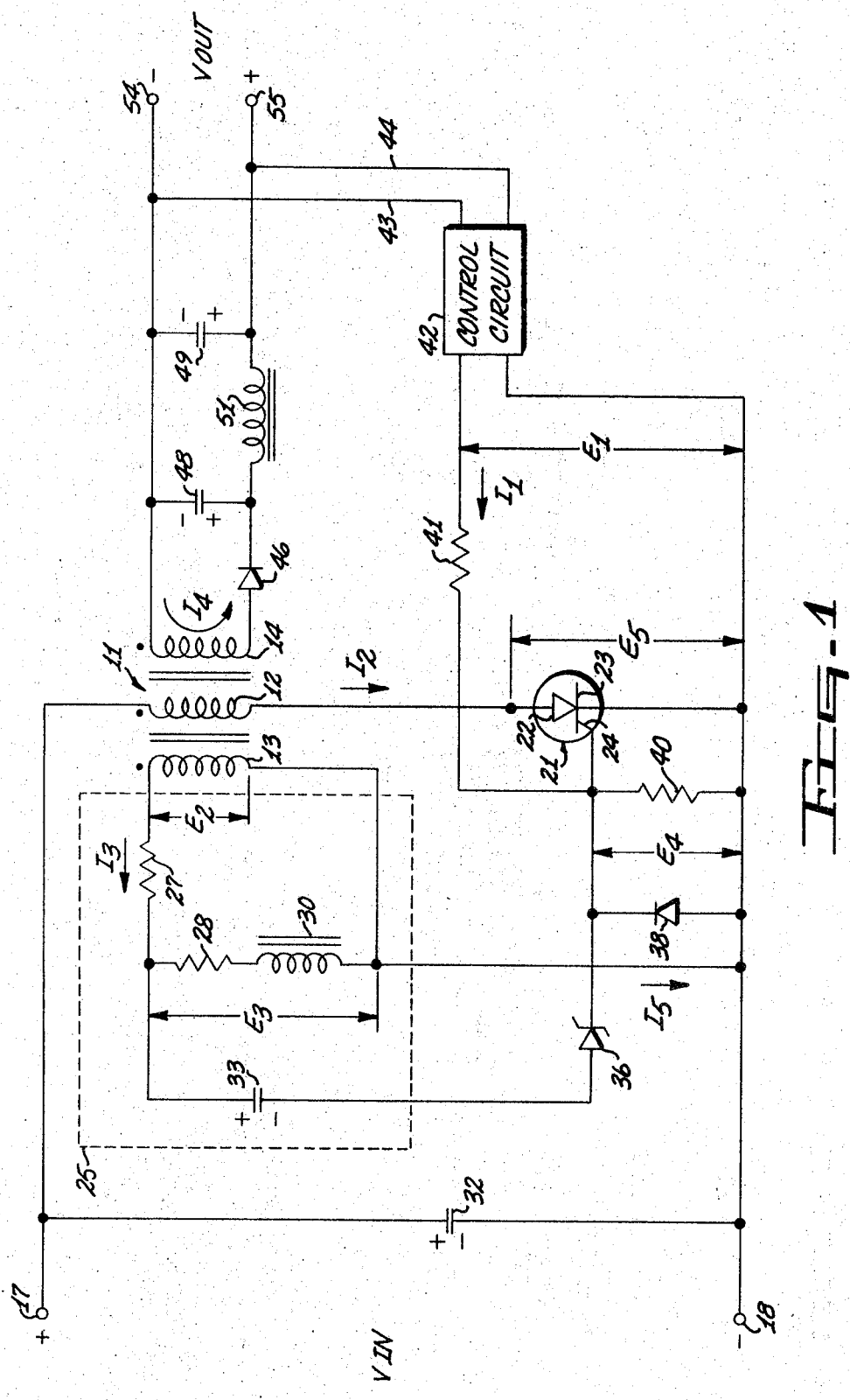
FIG. 1 is a schematic drawing of a switching regulator using a single gate-turn-off silicon controlled rectifier.

Referring more particularly to the drawings by the characters of reference, FIG. 1 discloses a switching regulator which is designed to provide a constant supply of DC output voltage for a wide range of values of output current. As indicated in FIG. 1, the switching regulator comprises a transformer 11 having a primary winding 12 and a pair of secondary windings 13 and 14. One end of the primary winding 12 is connected to a positive input terminal 17 and the other end of winding 12 is connected to the anode 22 of a gate-turn-off silicon controlled rectifier 21. The cathode 23 of the gate-turn-off silicon control rectifier or SCR is connected to a negative input terminal 18. An unregulated DC power supply is connected between the input terminal 17 and 18 of the switching regulator of FIG. 1. The gate 24 of the gate-turn-off SCR is connected through resistor 41 to one lead of the control circuit or signal source 42 which supplies pulses to turn on SCR 21.

The gate-turn-off SCR is employed as an ON-OFF switch between the lower end of winding 12 and the negative input terminal 17. Normally the SCR cannot conduct current between the anode and the cathode thereof until a current larger than a threshold value flows from gate to cathode. If a positive voltage difference exists between the anode and the cathode when the current flows in the gate, the SCR "fires," i.e., is rendered conductive, and a current will flow from anode to cathode. Once anode-cathode current flow commences, the current flow continues until a reverse current from cathode to gate turns the SCR off, or until anode current is reduced below a "holding" or minimum current value.

Once the SCR has been turned on the timing circuit 25 determines the duration of time the SCR conducts and determines the amount of electrical energy which is supplied to the output terminals of the switching regulator. The timing circuit then provides a reverse current to the gate of SCR 21 which causes the SCR to be turned off. The control circuit 42 and timing circuit 25 are employed to selectively turn on the SCR for a fixed period of time so that a fixed quantity of energy is transferred from the source of unregulated DC voltage through the transformer to the filter circuit each time the signal source supplies a signal current to the SCR. The frequency of the pulses from the control circuit 42 is determined by the voltage between the input leads 43 and 44. When an increase in the amount of current drawn by a load (not shown) connected across the output terminals 54 and 55 in FIG. 1 causes the value of voltage between leads 43 and 44 to fall below a predetermined reference level the frequency of the output pulses from current 42 increases. This increase in frequency of the pulses causes an increase in the rate of energy delivered to the filter capacitors 48 and 49 and increases the voltage at leads 43 and 44 to the predetermined reference level. The voltage at output terminals 54 and 55 controls the frequency of pulses from circuit 42 so that the voltage between output terminals 54 and 55 is substantially constant even when the current from power supply varies over a wide range of values. The transformer provides isolation between the source of unregulated DC voltage and the filter circuit. The upper frequency of the control circuit is limited and the total quantity of energy transferred from the source of unregulated DC voltage is limited so that a short circuit in the filter circuit would not cause excessive currents in the switching regulator.

The operation of the circuit of FIG. 1 will now be discussed in connection with the waveforms shown in FIG. 2. The timing circuit 25 causes the unregulated DC power supply to provide a predetermined quantity of energy to transformer 11 each time the SCR 21 is rendered conductive. Prior to time t1 shown in FIG. 2 SCR 21 is nonconductive. At time t1 a pulse of voltage E1 from the control circuit 42, provides a current I1 which flows from the upper output lead of circuit 42 through resistor 41, from gate 24 to cathode 23 of SCR 21, to the lower output lead of circuit 42. The zener diode 36 prevents current from flowing from circuit 42 to capacitor 33. Current I1 renders SCR 21 conductive so that the voltage across capacitor 32 is applied to the primary winding 12 of transformer 11. Transformer 11 has a linear inductance so that a fixed value of voltage applied across the primary winding 12 causes a linear increase in current through the primary winding as shown in waveform 12 of FIG. 2. When SCR 21 is rendered conductive a current flows from the positive input terminal 17 through primary winding 12, from anode 22 to cathode 23 of the SCR to the negative input terminal 18. The current I2 starts at an initial value of zero and builds up at a constant rate as determined by the relationship $di/dt = E/L$, where E is the voltage across winding 12, L is the inductance of the winding 12, and di/dt is the rate of change of the current I2.

The voltage applied across primary winding 12 is magnetically coupled through the transformer core to the secondary windings 13 and 14. Between time $t1$ and time $t2$ secondary windings 13 and 14 each have a positive polarity of voltage to the upper end of the winding and a negative polarity of voltage at the lower end of the winding. This voltage across secondary winding 13 causes a current I3 to flow from the upper end of winding 13 through resistor 27 to the upper plate of capacitor 33, from the lower plate of capacitor 33 through zener diode 36 to the gate of SCR 21, from gate 24 to cathode 23 of the SCR to the lower end of secondary winding 13. At this same time the voltage across secondary winding 14 causes diode 46 to be back biased so that no current flows through the diode or through the secondary winding 14.

Between time $t1$ and time $t2$ the voltage across the secondary winding 13 is also impressed across resistor 28 and inductor 30. The core of inductor 30 is made of a square-loop material which saturates after the volt-second rating of the inductor is exceeded. When the volt-second rating of the inductor is exceeded the voltage across the inductor 30 drops so that the capacitor 33 discharges through resistor 28 and inductor 30 thereby supplying reverse gate current which turns off the SCR 21. This reverse current I5 flows from the upper plate of capacitor 33 through resistor 28 and inductor 30 to the cathode 23 of the SCR 21, from cathode 23 to gate 24 of the SCR, through the zener diode 36 to the lower plate of capacitor 33. Current I5 causes the SCR 21 to be rendered nonconductive so that current I2 terminates at time $t2$ as shown in FIG. 2.

When SCR 21 is rendered nonconductive at time t2 the voltages across the windings of transformer 11 reverse as shown in waveform E2. The voltage across secondary winding 14 causes a current I4 to flow through diode 46 to the lower plates of capacitors 48 and 49, from the upper plates of the capacitors to the upper end of winding 14. The energy which was stored in transformer 11 is transferred through the winding 14 and stored as a charge on the capacitors. The value of this energy is given by the formula, energy = $1/2LI^2$ where L is the inductance of primary winding 12 and I is the value of the current I2. Substantially all of the energy which was stored in the transformer is transferred to the filter capacitors 48 and 49. Current I4 starts at a large value when the energy stored in the transformers is large and decreases at a linear rate as the energy is transferred to the filter capacitors as shown in waveform I4 between times $t2$ and $t3$.

The timing circuit 25 and especially inductor 30 cause the value of the energy stored in transformer 11 to be substantially the same each time the SCR 21 is rendered conductive, even when the value of the input voltage, Vin varies over a wide range of values. For example, when the voltage across capacitor 32 increases, the current I2 through primary winding 12 increases more rapidly, starting at time $t1$ causing I2 to reach the maximum value shown in FIG. 2 in a shorter period of time. Because the voltage E2 across secondary winding 12 is directly proportional to the input voltage Vin, the voltage applied to inductor 30 at time $t1$ is greater when the value of Vin is greater. Thus, the volt-second rating of inductor 30 is reached in a shorter period of time after time t1. The rate of rise of current I2 is greater, but the period of rise is shorter. The total energy stored in transformer 11 is substantially the same as when a lower value of Vin is applied to input terminals 17 and 18 and the total energy transferred to capacitors 48 and 49 is substantially the same. Each trigger pulse shown in waveform E1 causes a predetermined amount of energy to be transferred from the input terminals 17 and 18 through transformer 11 to the output filter capacitors 48 and 49 even through the input voltage Vin may vary over a wide range of values.

The voltage across capacitors 48 and 49 can be regulated by controlling the frequency of the signal pulses which the circuit 42 applies to the gate of the SCR 21. The frequency of these signal pulses is determined by the value of voltage at terminal 55. When an increase in the amount of current drawn by load (not shown) connected across the output terminals 54 and 55 causes the value of voltage at terminal 55 to fall below a predetermined reference level, the frequency of the output pulses from the control circuit 42 increases. This increase in the frequency of the output pulses causes an increase in the rate of the energy delivered to filter capacitors 48 and 49 and increase the voltage at the output terminal 55 to the predetermined reference level. The voltage at output terminal 55 controls the frequency of pulses from the control circuit 42 so that the voltage between output terminals 54 and 55 is substantially constant even when the current drawn from this power supply varies over a wide range of value.

While the principles of the invention have now been made clear in an illustrative embodiment, there will be many obvious modifications of the structure, proportions, materials and components without department from those principles. The appended claims are intended to cover any such modifications.

I claim:

1. A switching regulator for use with an automatically controlled signal source and a power supply having a positive terminal and a negative terminal, said regulator comprising:
- a transformer having a primary winding and first and second secondary windings;
- a gate-turn-off silicon controlled rectifier having an anode, a cathode and a gate, said primary winding of said transformer being connected between said anode of said rectifier and said positive terminal, said cathode of said rectifier being connected to said negative terminal, said signal source being connected between said gate and said cathode of said rectifier;
- a timing circuit, said circuit being connected between a first and a second end of said first secondary winding of said transformer, said circuit being connected between said gate and said cathode of said rectifier;
- a diode having an anode and a cathode, said anode of said diode being connected to a first end of said second secondary winding of said transformer; and
- a first capacitor, said first capacitor being connected between said cathode of said diode and a second end of said second secondary winding of said transformer.

2. A switching regulator as defined in claim 1 wherein:
- said source has a pair of input leads, said source developing output pulses having a frequency determined by the value of a voltage applied between said input leads; and said regulator includes means for coupling said input leads of said source to said first capacitor.

3. A switching regulator as defined in claim 1 wherein said timing circuit includes:
- first and second resistors, said first resistor being connected between a first end of said first secondary winding and a first end of said second resistor;
- a second capacitor having first and second leads, said first lead of said second capacitor being connected to said first end of said second resistor, said second lead of said second capacitor being coupled to said gate of said rectifier; and
- an inductor, said inductor being connected between a second end of said second resistor and a second end of said first secondary winding, said second end of said first secondary winding being connected to said cathode of said rectifier.

4. A switching regulator as defined in claim 3 wherein:
- said source has a pair of input leads, said source developing output pulses having a frequency determined by the value of a voltage applied between said input leads; and said regulator includes means for coupling said input leads of said source to said first capacitor.

5. A switching regulator for use with an automatically controlled signal source having a pair of input leads and a pair of output leads, and a power supply having a positive terminal and a negative terminal, said regulator comprising:
- a transformer having a primary and first and second secondary windings;
- a gate-turn-off silicon controlled rectifier having an anode, a cathode and a gate, said primary winding of said transformer being connected between said anode of said rectifier and said positive terminal, said cathode of said rectifier being connected to said negative terminal, a first output lead of said source being connected to said gate of said rectifier, a second output lead of said source being connected to said cathode of said rectifier;
- first and second resistors, said first resistor being connected between a first end of said first secondary winding and a first end of said second resistor;
- a zener diode having an anode and a cathode, said cathode of said zener diode being connected to said gate of said rectifier;
- first and second capacitors, said second capacitor being connected between said first end of said second resistor and said anode of said zener diode;
- a first inductor, said first inductor being connected between a second end of said second resistor and a second end of said first secondary winding, said second end of said first inductor being connected to said cathode of said rectifier; and
- a first diode having an anode and a cathode, said anode of said first diode being connected to a first end of said second secondary winding, said first capacitor being connected between said cathode of said first diode and a second end of said second secondary winding.

6. A switching regulator as defined in claim 5 wherein:
- said source has a pair of input leads, said source developing output pulses having a frequency determined by the value of a voltage applied between said input leads; and said regulator includes means for coupling said input leads of said source to said first capacitor.

7. A switching regulator as defined in claim 5 including:
- a second diode, said second diode being connected between said gate and said cathode of said rectifier; and wherein:
- said source has a pair of input leads, said source developing output pulses having a frequency determined by the value of a voltage applied between said input leads; and said regulator includes means for coupling said input leads of said source to said first capacitor.

8. A switching regulator as defined in claim 5 including:
- a second diode, said second diode being connected between said gate and said cathode of said rectifier;
- a second inductor;
- first and second output terminals, said second inductor being connected between said first output terminal and said cathode of said first diode, said second output terminal being connected to said second end of said second secondary winding;
- a third capacitor, said third capacitor being connected between said first and said second output terminals; and wherein
- said source has a pair of input leads, said source developing output pulses having a frequency determined by the value of voltage applied between said input leads, a first of said input leads being connected to said first output terminal, a second of said input leads being connected to said second output terminal.

* * * * *